US012717973B1

(12) United States Patent
Raz

(10) Patent No.: US 12,717,973 B1
(45) Date of Patent: Aug. 25, 2026

(54) SYSTEM AND METHOD FOR IMMUTABLE CONFIGURATION OF RECONFIGURABLE PROCESSING CIRCUITRY

(71) Applicant: Next Silicon Ltd, Givatayim (IL)

(72) Inventor: Elad Raz, Ramat Gan (IL)

(73) Assignee: Next Silicon Ltd, Givatayim (IL)

( * ) Notice: Subject to any disclaimer, the term of this patent is extended or adjusted under 35 U.S.C. 154(b) by 0 days.

(21) Appl. No.: 19/347,828

(22) Filed: Oct. 2, 2025

(51) Int. Cl.
*G06F 21/71* (2013.01)
*G06F 21/31* (2013.01)

(52) U.S. Cl.
CPC .............. *G06F 21/71* (2013.01); *G06F 21/31* (2013.01)

(58) Field of Classification Search
CPC ................................. G06F 21/71; G06F 21/31
USPC ............................................... 726/17, 18, 26
See application file for complete search history.

(56) References Cited

U.S. PATENT DOCUMENTS 9,980,128 B2 * 5/2018 Hur ........................ H04W 12/06
11,616,803 B2 * 3/2023 Shua .................. H04L 63/1433 726/26
2001/0015919 A1 * 8/2001 Kean ....................... G06F 21/76 711/E12.092
2007/0288765 A1 * 12/2007 Kean ....................... G06F 21/76 713/193
2013/0212700 A1 * 8/2013 Grocutt ................. G06F 21/606 726/27
2014/0325175 A1 * 10/2014 Vorbach ................ G06F 9/3001 711/164
2020/0020222 A1 * 1/2020 Lundardhi ............. G08B 29/18
2020/0356523 A1 * 11/2020 Prabhakar ............... G06F 9/522
2024/0184468 A1 * 6/2024 Cao ....................... G06F 3/0604
2025/0321886 A1 * 10/2025 Coppola ............. G06F 12/0246

OTHER PUBLICATIONS

NPL Search Terms (Year: 2025).*

* cited by examiner

*Primary Examiner* — Syed A Zaidi

(57) ABSTRACT

A system for computing comprising: a reconfigurable computing device, comprising: a lockable circuitry comprising: reconfigurable data routing junctions, each having a configuration interface and an internal configuration; a lock controller, connected to each of the reconfigurable data routing junctions; and a hardware lock bit; wherein the lock controller is configured to deliver a persistent lock signal to each of the reconfigurable data routing junctions when the hardware lock bit is in a locked state; wherein the hardware lock bit is transitioned from the locked state to an unlocked state only by a power cycle of the reconfigurable computing device; and wherein each reconfigurable data routing junction is configured to, in response to assertion of the persistent lock signal: lock the reconfigurable data routing junction's internal configuration; and decline to modify the internal configuration in response to one or more configuration signals received via the configuration interface.

20 Claims, 9 Drawing Sheets

900

SYSTEM AND METHOD FOR IMMUTABLE CONFIGURATION OF RECONFIGURABLE PROCESSING CIRCUITRY

FIELD AND BACKGROUND OF THE INVENTION

Some embodiments described in the present disclosure relate to a system for immutable configuration of computational modules in a reconfigurable computing device and, more specifically, but not exclusively, to a hardware-enforced immutable configuration of a computational module in a reconfigurable computing device.

Reconfigurable computing architectures have emerged as a powerful paradigm for achieving high-performance computation while maintaining flexibility for diverse applications. As used herein, the term "reconfigurable computing architecture" refers to a hardware system comprising one or more reconfigurable computing components that can be dynamically modified to implement different computational functions. Typically, each reconfigurable computing component comprises a plurality of reconfigurable logical elements and a plurality of reconfigurable interconnections that can be dynamically modified to implement different computational functions. One example of a reconfigurable computing component is a Field-Programmable Gate Array (FPGA), utilizing fine-grained reconfigurable elements that can be programmed at the bit level to implement arbitrary digital circuits. Another example of a reconfigurable computing component is a Coarse-Grained Reconfigurable Array (CGRA), that operates at the word level rather than the bit level. A reconfigurable computing architecture may comprise one or more reconfigurable computing components that are all of the same type. A reconfigurable computing architecture may comprise more than one type of reconfigurable computing component.

One type of computation that benefits from a reconfigurable computing architecture is a dataflow computing architecture, wherein computation is organized as a directed graph of operations connected by data dependencies. As used herein, the term "dataflow architecture" refers to a computing system where the flow of data through a network of processing elements determines the execution order of operations, rather than a program counter as in traditional von Neumann architectures. In such systems, a compute graph comprising nodes representing operations and edges representing data paths is mapped onto a physical substrate of logical elements and routing junctions.

As used herein, the term reconfigurable dataflow architecture refers to a dataflow architecture implemented in a reconfigurable computing architecture. The fundamental building blocks of implementing a reconfigurable dataflow architecture include reconfigurable logical elements and reconfigurable data routing junctions. As used herein, the term "logical element" refers to a computational unit capable of performing one or more operations on input data, for example an arithmetic operation, a logical operation, or a control operation. As used herein, the term "reconfigurable data routing junction" refers to a programmable switching element, such as a multiplexer, that can be configured to establish data paths between logical elements according to a specified routing configuration and to control the one or more operations performed by one or more logical elements.

A configuration process in reconfigurable architectures typically involves loading configuration data that specifies the function of each logical element and the routing paths established by each data routing junction. This configuration data is used to program the hardware to implement one or more specific computational functions. The ability to modify this configuration during operation provides the flexibility that makes reconfigurable architectures attractive for diverse applications.

Security considerations have become increasingly critical in modern computing systems, particularly for applications handling sensitive data or operating in adversarial environments. For example, some government and commercial sectors require computing systems that meet stringent security standards. An example of a security standard is one of the Federal Information Processing Standard (FIPS) 140 series of standards, for example FIPS 140-2 or its successor FIPS 140-3. For brevity, hereinafter, unless otherwise noted, the term "FIPS 140" refers to any existing or future standard in the Federal Information Processing Standard 140 series of standards.

A fundamental requirement of some security standards, for example some standards in the FIPS 140 series, is the establishment of an explicitly defined cryptographic boundary that encompasses all hardware, software, and firmware components implementing cryptographic functions. As used herein, the term "cryptographic function" refers to a set of computational operations that transforms data to provide a security service such as confidentiality, integrity, authentication, or non-repudiation, or any combination thereof. Some examples of a cryptographic function include, but are not limited to, a symmetric encryption algorithm such as Advanced Encryption Standard (AES), an asymmetric encryption algorithm such as Rivest-Shamir-Adleman (RSA), a cryptographic hash function such as Secure Hash Algorithm (SHA), a message authentication code such as Hash-based Message Authentication Code (HMAC), a digital signature algorithm, and a key derivation function. In addition, as used herein, the term "cryptographic module" refers to a set of hardware, software, and firmware components that implements one or more cryptographic functions and operates within a defined cryptographic boundary. A cryptographic module includes all components necessary for the secure generation, storage, management, and use of cryptographic keys and other critical security parameters (for examples Critical Security Parameters as defined in FIPS 140), as well as the computational resources required to execute cryptographic operations. The cryptographic module encompasses both the cryptographic functions themselves and the supporting infrastructure required for their secure operation, including authentication mechanisms, access controls, and tamper detection systems where applicable. In addition, as used herein, the term "cryptographic boundary" refers to a clearly delineated perimeter that defines the physical and logical extent of a cryptographic module, wherein all cryptographic operations are performed and all critical security parameters are contained. The cryptographic boundary must be stable, verifiable, and maintain its integrity throughout the operational lifetime of the module.

Traditional approaches to achieving compliance with security standards have focused on dedicated cryptographic processors or specialized security components that implement fixed cryptographic functions in hardware. However, the inherent reconfigurability of reconfigurable architectures presents a fundamental conflict with security requirements for stable, verifiable cryptographic boundaries, as the very flexibility that provides computational advantages also introduces security vulnerabilities through potential runtime reconfiguration attacks.

SUMMARY OF THE INVENTION

It is an object of some embodiments described in the present disclosure to provide a system and method for establishing immutable computational modules in a reconfigurable computing architecture.

Some embodiments described in the present disclosure address the fundamental conflict between the dynamic reconfigurability of a reconfigurable computing architecture and the need for stable, verifiable cryptographic boundaries by introducing a hardware-enforced immutable configuration mechanism.

Some embodiments described herein provide a reconfigurable computing system comprising lockable processing circuitry that can transition from a flexible, reconfigurable state to a fixed, secure operational mode. In such embodiments, the system includes a group of reconfigurable data routing junctions, each having a configuration interface and an internal configuration, wherein the routing junctions are connected to a lock controller that delivers a persistent lock signal when activated. Optionally, a hardware lock bit, connected to the lock controller, can transition from an unlocked state to a locked state during operation, however the hardware lock bit is transitioned from the locked state to the unlocked state only by a power cycle. In such embodiments, when the lock signal is asserted each reconfigurable data routing junction that receives the lock signal locks its internal configuration and declines to modify that configuration in response to subsequent configuration signals, thereby establishing an immutable data path and set of operations that satisfies cryptographic boundary requirements.

Implementing a computational module in a reconfigurable computing architecture using this mechanism allows maintaining integrity of the computational module, thus allowing a system comprising the computational module and implemented in a reconfigurable computing architecture to comply with some stringent requirements of security standards, while still enjoying the advantages of reconfiguration of other modules of the system.

The foregoing and other objects are achieved by the features of the independent claims. Further implementation forms are apparent from the dependent claims, the description and the figures.

According to a first aspect, a system for computing comprises: a reconfigurable computing device, comprising: a lockable circuitry comprising: a group of reconfigurable data routing junctions, each having a configuration interface and an internal configuration; a lock controller, connected to each of the group of reconfigurable data routing junctions in the lockable circuitry; and a hardware lock bit, connected to the lock controller and having a locked state and an unlocked state; wherein the lock controller is configured to deliver a persistent lock signal to each of the group of reconfigurable data routing junctions in the lockable circuitry when the hardware lock bit is in the locked state; wherein the hardware lock bit is transitioned from the locked state to the unlocked state only by a power cycle of the system; and wherein each reconfigurable data routing junction in the lockable circuitry is configured to, in response to assertion of the persistent lock signal: lock the reconfigurable data routing junction's internal configuration; and decline to modify the internal configuration in response to one or more configuration signals received via the configuration interface.

According to a second aspect, a method for a system for computing comprises: configuring a lockable circuitry of a reconfigurable computing device, the lockable circuitry comprising a group of reconfigurable data routing junctions, each having a configuration interface and an internal configuration; transitioning a hardware lock bit of the lockable circuitry to a locked state, where the hardware lock bit has a locked state and an unlocked state and the hardware lock bit is transitioned from the locked state to the unlocked state only by a power cycle of the system; delivering a persistent lock signal to each of the group of reconfigurable data routing junctions of the lockable circuitry when the hardware lock bit is in the locked state; and by each reconfigurable data routing junction of the group of reconfigurable data routing junctions, in response to assertion of the persistent lock signal: locking the reconfigurable data routing junction's internal configuration; and declining to modify the internal configuration in response to one or more configuration signals received via the configuration interface.

According to a third aspect, a device for computing comprises: a lockable circuitry comprising: a group of reconfigurable data routing junctions, each having a configuration interface and an internal configuration; a lock controller, connected to each of the group of reconfigurable data routing junctions in the lockable circuitry; and a hardware lock bit, connected to the lock controller and having a locked state and an unlocked state; wherein the lock controller is configured to deliver a persistent lock signal to each of the group of reconfigurable data routing junctions in the lockable circuitry when the hardware lock bit is in the locked state; wherein the hardware lock bit is transitioned from the locked state to the unlocked state only by a power cycle of a system in which the device operates; and wherein each reconfigurable data routing junction in the lockable circuitry is configured to, in response to assertion of the persistent lock signal: lock the reconfigurable data routing junction's internal configuration; and decline to modify the internal configuration in response to one or more configuration signals received via the configuration interface.

According to a fourth aspect, a method for a device for computing comprises: when a hardware lock bit of lockable circuitry of a reconfigurable computing device is in a locked state: delivering a persistent lock signal to each of a group of reconfigurable data routing junctions of a lockable circuitry, where each of the group of reconfigurable data routing junctions has a configuration interface and an internal configuration; and by each reconfigurable data routing junction of the group of reconfigurable data routing junctions, in response to assertion of the persistent lock signal: locking the reconfigurable data routing junction's internal configuration; and declining to modify the internal configuration in response to one or more configuration signals received via the configuration interface; wherein the hardware lock bit has a locked state and an unlocked state; and wherein the hardware lock bit is transitioned from the locked state to the unlocked state only by a power cycle of a system in which the device operates.

With reference to the first and second aspects, in a first possible implementation of the first and second aspects the reconfigurable computing device further comprises at least one other lockable circuitry, each having: another group of reconfigurable data routing junctions; another lock controller; and another hardware lock bit; wherein the at least one other lockable circuitry operates independently of the lockable circuitry. Having a device with more than one lockable circuitry increases usability of the device and security of computational modules executed thereon, allowing multiple different computational modules to be implemented simultaneously and independently on the device. More specifically, having a device with more than one lockable circuitry allows a computational module implemented on one of the more than one lockable circuitry to have a security status that is independent from another security status of another computational module implemented on another of the more than one lockable circuitry. This allows enabling and disabling one computational module without effecting others, and compromise of one computational module does not necessarily compromise another computational module.

With reference to the first and second aspects, in a second possible implementation of the first and second aspects the reconfigurable computing device further comprises a configuration engine configured to: receive configuration data and an instruction for secure configuration; and in response to the instruction for secure configuration: configure the lockable circuitry of the reconfigurable computing device using the configuration data; and transition the hardware lock bit to the locked state following a successful configuration of the lockable circuitry using the configuration data. Optionally, the configuration engine is further configured to, at least once, decline to configure the lockable circuitry following transitioning the lock bit to the locked state. Using an explicit instruction for secure configuration, i.e. different than a configuration that is not necessarily secure, facilitates handling the configuration differently, for example transitioning a hardware lock bit to the locked state as an integral part of the configuration process, reducing risk of a security breach. Declining to configure the lockable circuitry after the lock bit has transitioned to the locked state increases security, reducing the likelihood that the lockable circuitry is modified to execute a malicious functionality.

With reference to the first and second aspects, or the second implementation of the first and second aspects, in a third possible implementation of the first and second aspects the system further comprises a security controller configured to: validate the configuration data; and deliver the instruction for secure configuration to the configuration engine. Instructing secure configuration only after validating the data increases the security of the system by reducing likelihood that the configuration data was tampered with. Optionally, the security controller is further configured to authenticate an operator before validating the configuration data and delivering the instruction for secure configuration to the configuration engine. Authenticating an operator further increases security of the system. Optionally, the security controller is further configured to transition the hardware lock bit to the locked state following a successful configuration of the lockable circuitry using the configuration data, instead of the configuration engine. Transitioning the hardware lock bit to the locked state by the security controller instead of the configuration engine allows the security controller to perform additional steps, for example validating steps, before locking the circuitry. Optionally, the security controller is further configured to authenticate an operator before validating the configuration data and delivering the instruction for secure configuration to the configuration engine. Optionally, the security controller is further configured to transition the hardware lock bit from the unlocked state to the locked state in response to an explicit lock command received from the authenticated operator.

With reference to the first and second aspects, or the second and third implementations of the first and second aspects, in a fourth possible implementation of the first and second aspects the security controller is further configured to perform at least one integrity test of the configuration of the lockable circuitry after a successful configuration of the lockable circuitry using the configuration data. Performing an integrity test after configuration increases security of the system, allowing to discover a compromised lockable circuitry and prevent access to it. This is useful both before locking the lockable circuitry and allowing access to it and during system operation, if the lockable circuitry was compromised after configuration and locking. Optionally, the reconfigurable computing device further comprises security circuitry, and the security controller is further configured to instruct the security circuitry to perform the at least one integrity test. Optionally, the system further comprises at least one hardware processor connected to the reconfigurable computing device. Optionally, the security controller is further configured to send one or more alert indications to the at least one hardware processor upon an unsuccessful outcome of performing one or more of the at least one integrity test. Optionally, the at least one hardware processor is configured to execute an application and the security controller is further configured to prevent operation of the lockable circuitry upon an unsuccessful outcome of performing one or more of the at least one integrity test. Alerting another hardware processor about an unsuccessful outcome of performing one or more of the one or more integrity tests increases system security, facilitating notifying a system administrator and additionally or alternatively blocking an application executed by the system from accessing compromised lockable circuitry. Preventing operation of the compromised lockable circuitry increases system security. Optionally, the security controller is configured to perform one or more of the at least one integrity test periodically, according to an identified time interval. Perioding checking integrity of the lockable circuitry increases system security. Optionally, the security controller is further configured to authenticate an operator before validating the configuration data and delivering the instruction for secure configuration to the configuration engine, and the security controller is configured to perform one or more other of the at least one integrity test in response to an instruction from the authenticated operator. Allowing an authenticated operator to initiate an integrity test further increases system security.

With reference to the first and second aspects, in a fifth possible implementation of the first and second aspects the hardware lock bit is implemented comprising a flip-flop circuit. Additionally or alternatively the hardware lock bit is implemented comprising an electronic fuse (eFuse). Further additionally or alternatively, the hardware lock bit is implemented comprising a Statice Random-Access Memory (SRAM) bit. Further additionally or alternatively, the hardware lock bit is implemented comprising a ferroelectric random access memory (FRAM).

With reference to the first and second aspects, in a sixth possible implementation of the first and second aspects the lockable circuitry further comprises a group of reconfigurable logical elements, wherein the group of reconfigurable logical elements are connected by the group of reconfigurable data routing junctions. Optionally, at least one reconfigurable data routing junction of the group of reconfigurable data routing junctions is connected to at least one of the group of reconfigurable logical elements, the at least one reconfigurable logical element can be configured to implement one of a plurality of operations, and the at least one reconfigurable data routing junction selects one of the plurality of operations to be implemented by the at least one reconfigurable logical element. When the reconfigurable data routing junction selects the operation implemented by a reconfigurable logical element, locking the configuration of the reconfigurable data routing junction locks the operation of the reconfigurable logical element, increasing reliability of the lockable circuitry.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the accompanying drawings, like reference numerals are used consistently across the figures to denote like elements or components. This consistency is intended to aid in the understanding of the embodiments and should not be construed as limiting the scope of the invention to the specific configurations illustrated.

DESCRIPTION OF SPECIFIC EMBODIMENTS OF THE INVENTION

Figure 1:
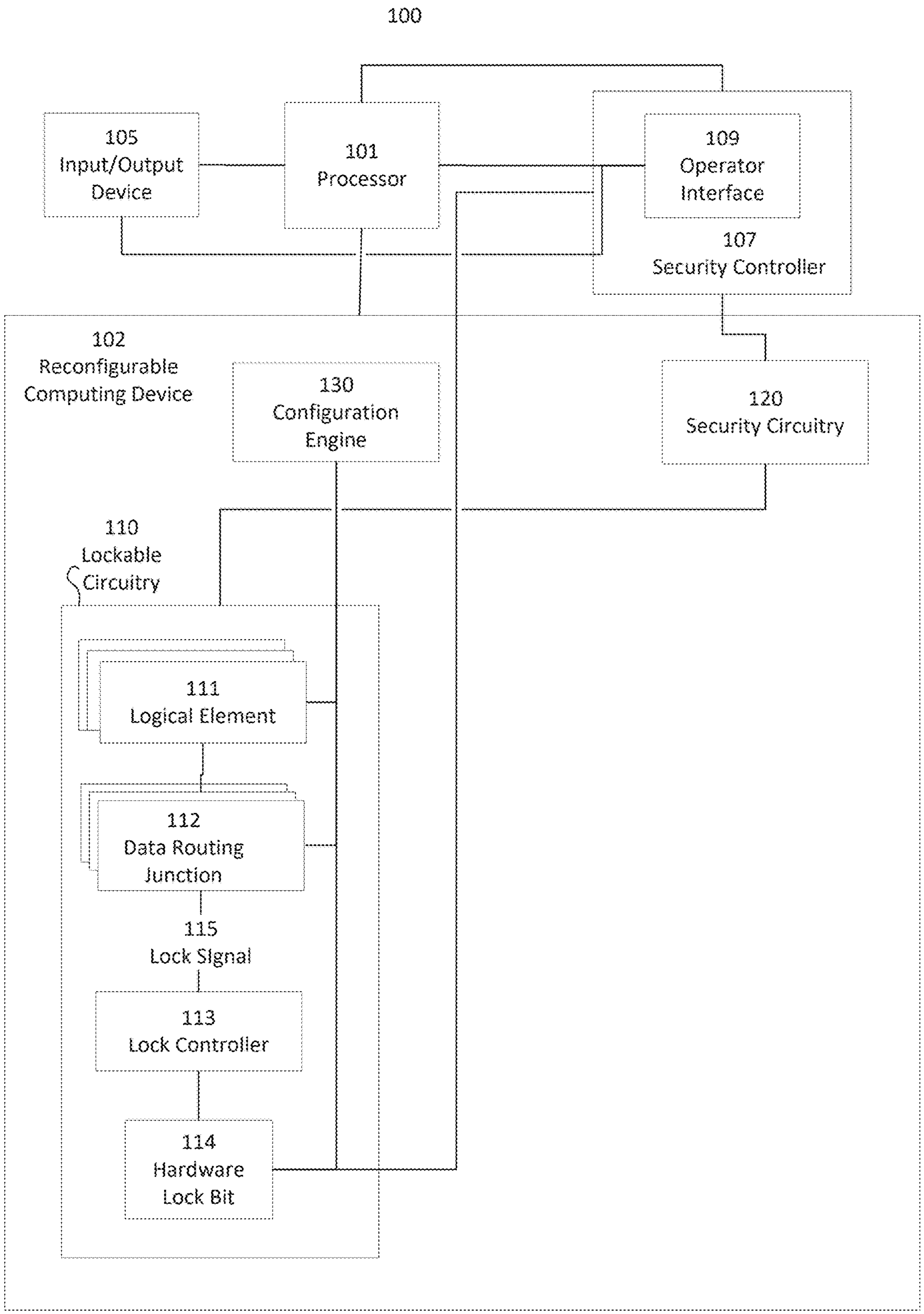
FIG. 1 is a schematic block diagram of an exemplary system, according to some embodiments.

Some embodiments described in the present disclosure relate to a system for immutable configuration of computational modules in a reconfigurable computing device and, more specifically, but not exclusively, to a hardware-enforced immutable configuration of a computational module in a reconfigurable computing device.

The present disclosure addresses a critical technical problem in the field of secure computing: the inherent incompatibility between the dynamic reconfigurability of modern reconfigurable architectures and the stringent security requirements imposed by cryptographic standards such as FIPS 140. Traditional reconfigurable computing systems, while offering exceptional flexibility and performance for diverse computational tasks, present fundamental security vulnerabilities that preclude their use in applications requiring certified cryptographic security.

One technical challenge arises from the conflict between two essential requirements. On one hand, reconfigurable dataflow architectures derive their computational advantages from the ability to dynamically modify their configuration during operation, allowing a single hardware platform to implement multiple different computational functions as needed. On the other hand, some security standards require the establishment of an explicitly defined, stable boundary that encompasses a fixed set of hardware, software, and firmware components implementing identified functions, for example cryptographic functions. This boundary is referred to as the cryptographic boundary. The cryptographic boundary must remain invariant throughout the operational lifetime of the module to ensure that the security properties of the module remain verifiable.

Some existing approaches to this problem have proven inadequate for several reasons. Simple software-based configuration locks can be bypassed through various attack vectors, including malicious software, hardware tampering, or exploitation of system vulnerabilities. Hardware security components that operate independently of the main processing system fail to leverage the performance advantages of reconfigurable architectures and require additional system complexity and cost. Conventional reconfigurable systems with bolt-on security features cannot achieve the level of integration required for high-security applications, as the security mechanisms remain external to the core computational fabric.

The present disclosure, in some embodiments described herein, proposes to solve this technical problem by introducing a novel hardware-based locking mechanism that enables a reconfigurable architecture to transition irreversibly from a flexible, reconfigurable state to a fixed, secure operational mode. These embodiments provide a computing system that maintains the performance advantages of reconfigurable architectures while satisfying the stringent security requirements of security standards through hardware-enforced immutability.

The present disclosure, in some embodiments described herein, proposes integration of a lockable processing circuitry within the reconfigurable architecture, wherein a hardware lock bit controls a lock controller that delivers a persistent lock signal to a group of reconfigurable data routing junctions of the lockable circuitry.

For brevity, unless otherwise noted the term "lockable circuitry" is used to mean "lockable processing circuitry" and the terms are used interchangeably. Optionally, the group of reconfigurable data routing junctions are all the reconfigurable data routing junctions within a defined security perimeter, encompassing one or more identified computation modules. When the lock signal is asserted, each reconfigurable data routing junction of the group of reconfigurable data routing junctions freezes its current configuration and becomes immune to subsequent reconfiguration attempts. When the configuration of the reconfigurable data routing junction determines one or more data paths between one or more logical elements of the lockable circuitry, and additionally or alternatively controls which operation or operations are performed by the one or more logical elements, freezing the configuration of each of the group of reconfigurable data routing junctions effectively transforms the dynamic architecture into a fixed-function computational module with a stable, verifiable boundary.

In such embodiments, the hardware lock can transition from an unlocked state to a locked state through a secure configuration process, but transitioning of the hardware lock from the locked state to the unlocked state is only through a power cycle of the system. This irreversible locking mechanism during normal operation ensures that once a configuration is loaded and verified, the resulting computational module cannot be modified through software attacks, malicious reconfiguration attempts, or other security breaches that do not involve physical access to the device.

Optionally, the system comprises a reconfigurable computing device that comprises the lockable circuitry. Optionally, the hardware lock bit is transitioned to the locked state following a successful outcome of configuring and validating the lockable processing circuitry. Optionally, the lock signal is activated (asserted) when the hardware lock bit is in the locked state. Optionally, the hardware lock bit is transitioned from the locked state to the unlocked state only by a power cycle of the system. Additionally, or alternatively, the hardware lock bit is transitioned from the locked state to the unlocked state only by a power cycle of the reconfigurable computing device. Some possible implementations of the hardware lock bit include, but are not limited to, a Static Random-Access Memory (SRAM) bit, a ferroelectric random access memory (FRAM), a flip-flop circuit or an electronic fuse (eFuse), or any combination thereof.

Optionally, the reconfigurable computing device supports more than one defined security perimeter, such that the reconfigurable computing device comprises one or more other lockable circuitries. Optionally, each of the one or more other lockable circuitries comprises another group of reconfigurable data routing junctions, another lock controller and another hardware lock bit. Optionally, each of the one or more other lockable circuitries operate independently of each other. More specifically, each of the one or more other lockable circuitries operates independent of the lockable circuitry.

Optionally, the reconfigurable computing device comprises a configuration engine for handling secure configuration of the lockable circuitry. Optionally, the configuration engine configures the lockable circuitry, for example using configuration data. Optionally, the configuration engine transitions the hardware lock bit, for example following a successful configuration of the lockable circuitry. Optionally, the configuration engine handles the secure configuration of the lockable circuitry in response to receiving an instruction for secure configuration.

Optionally, the system comprises a security controller. The security controller may be implemented in hardware, as one or more software objects executed by one or more hardware processors connected to the reconfigurable computing device, or any combination thereof. Optionally, at least part of the security controller is implemented in the reconfigurable computing device. Optionally, at least another part of the security controller is external to the reconfigurable computing device. Optionally, the security controller validates the configuration data provided to the configuration engine. Optionally, the security controller delivers the instruction for secure configuration to the configuration engine.

Optionally, the security controller is configured to test the integrity of the configuration of the lockable circuitry, for example by performing one or more integrity tests of the configuration of the lockable circuitry. The integrity of the configuration of the lockable circuitry may be performed after a successful configuration of the lockable circuitry using the configuration data. Optionally, the integrity of the configuration of the lockable circuitry is performed periodically. Optionally, transitioning the hardware lock bit to the locked state is subject to a successful outcome of the one or more integrity tests of the configuration of the lockable circuitry.

In some systems a secure configuration of the lockable circuitry requires authenticating an operator, authorized to configure the lockable circuitry. This increases security by ensuring the configuration data, and additionally or alternatively the instruction to perform the secure configuration is performed by an authorized entity and increases likelihood that a computation module configured to the lockable circuitry and locked therein is indeed a correct and secure computation module. Optionally, the security controller performs the authentication of the operator. The system may have more than one operator. An operator may be a human operator. Optionally, the human operator communicates with the security controller via an operator interface of the security controller. Optionally, an operator is a software component, for example a security management software component executed by the one or more hardware processors of the system. Optionally, the security management software component communicates with the security controller via the operator interface thereof. Optionally the authorized operator, i.e. the operator after being authorized by the security controller, instructs performing an integrity test of the configuration of the lockable circuitry.

In addition, the system may be configured to identify one or more security breaches, where configuration of the lockable circuitry has been compromised. For example, the configuration of the lockable circuitry is compromised when a configuration of one or more of the group of reconfigurable data routing junctions is different from the one or more reconfigurable data routing junctions' configuration according to the configuration data. In another example, the configuration of the lockable circuitry is compromised when the hardware lock bit is in the unlocked state after transitioning to the locked state and before a power cycle of the system and additionally or alternatively of the reconfigurable computing device. Optionally, the security controller identifies a security breach when an outcome of performing the one or more integrity tests is unsuccessful. Optionally, the security controller sends one or more alert indications to the one or more hardware processors, for example to the security management software component.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media)

having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), a coarse-grained reconfigurable architecture (CGRA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary system 100, according to some embodiments. In such embodiments, at least one reconfigurable computing device 102 is connected to at least one hardware processor 101.

For brevity, henceforth the term "processing unit" is used to mean "at least one hardware processor". The processing unit may be any kind of programmable or non-programmable circuitry that is configured to carry out the operations described below. The processing unit may comprise hardware as well as software. For example, the processing unit may comprise one or more processors and a transitory or non-transitory memory that carries a program which causes the processing unit to perform the respective operations when the program is executed by the one or more processors.

For brevity, henceforth the term "reconfigurable computing device" is used to mean "at least one reconfigurable computing device" and the terms are used interchangeably". Optionally, reconfigurable device 102 comprises a plurality of reconfigurable logical elements connected by a plurality of reconfigurable data routing junctions. An example of a reconfigurable logical element is processing circuitry that may be configured to perform one of an identified set of mathematical and logical operations and additionally or alternatively to perform one of a set of identified control operations. Some examples of a mathematical operation are addition, subtraction, multiplication and division. Some examples of a logical operation are a unitary Boolean operator such as NOT, a bitwise unitary Boolean operator such a bitwise NOT, a binary Boolean operator such as AND, OR and XOR, and a bitwise binary operator such as bitwise AND, bitwise OR and bitwise XOR. Some examples of a control operation are test, compare, and jump.

For brevity, henceforth the term "logical element" is used to mean "reconfigurable logical element" and the terms are used interchangeably. In addition, henceforth the term "routing junction" is used to mean "reconfigurable data routing junction" and the terms are used interchangeably.

Optionally, the plurality of logical elements is organized in a plurality of groups of logical elements, each comprising some of the plurality of logical elements connected by some of the plurality of routing junctions. For example, reconfigurable device 102 optionally comprises lockable circuitry 110, comprising group of logical elements 111 connected by group of routing junctions 112, where group of logical elements 111 comprises some of the plurality of logical elements of reconfigurable processing device 102 and group of routing junctions 112 comprises some of the plurality of routing junctions of reconfigurable processing device 102. Optionally, group of logical elements 111 comprises all of the plurality of logical elements of reconfigurable processing device 102 and additionally or alternatively all of the plurality of routing junctions of reconfigurable processing device 102.

Optionally, at least part of processing unit 101 is electrically coupled with reconfigurable computing device 102. Optionally, at least part of processing unit 101 is mounted on a common substrate as reconfigurable computing device 102, for example a printed circuit board (PCB). Optionally, at least part of processing unit 101 is connected to reconfigurable processing device 102 via a bus. Optionally, at least part of processing unit 101 is integrated in reconfigurable processing device 102.

Optionally, reconfigurable computing device 102 comprises configuration engine 130, optionally connected to the plurality of logical elements and the plurality of routing junctions. More specifically, the configuration engine 130 may be connected to group of logical elements 111 and group of routing junctions 112. Optionally, configuration engine 130 comprises one or more configuration engine circuitries, each connected to one or more groups of logical elements of the plurality of groups of logical elements, and additionally or alternatively to some routing junctions of the plurality of groups of routing junctions.

Optionally, reconfigurable computing device 102 comprises security circuitry 120. Optionally, security circuitry 120 is connected to lockable circuitry 110, for example to check the integrity of a configuration of lockable circuitry 110.

Optionally, system 100 comprises security controller 107. Optionally, at least part of the security controller 107 is implemented in hardware, for example in a component external to reconfigurable computing device 102. Optionally, at least another part of the security controller 107 is implemented in the reconfigurable computing device 102. Optionally, at least yet another part of the security controller 107 is implemented as one or more software objects executed by processing unit 101. Optionally, the security controller 107 is implemented using a combination of any of the component external to reconfigurable computing device 102, the one or more software objects executed by processing unit 101 and the reconfigurable computing device 102.

Optionally, the security controller 107 comprises an operator interface 109, for example to communicate with one or more operators of system 100. An operator may be a human operator. Optionally, the human operator communicates with the security controller 107 via operator interface 109, for example via one or more devices 105 connected to processing unit 101, where the one or more devices 105 comprise one or more input devices and additionally or alternatively output devices. Some examples of an input device include a mouse, a keyboard, and a digital network communication interface. Some examples of an output device include a display and the digital network communication interface. Optionally, an operator is a software component, for example a security management software component executed by processing unit 101. Optionally, the security management software component communicates with the security controller 107 via the operator interface 109.

Optionally, lockable circuitry 110 comprises a hardware lock bit 114. Optionally, hardware lock bit 114 has a locked state and an unlocked state. Optionally, after a power cycle of system 100, and additionally or alternatively of only reconfigurable computing device 102, hardware lock bit 114 is in the unlocked state. Optionally, during operation of system 100, hardware lock bit 114 may be transitioned to the locked state, for example by the configuration engine 130 and additionally or alternatively by the security controller 107. Optionally, the configuration engine 130 is connected to hardware lock bit 114 for the purpose of transitioning the hardware lock bit 114 to the locked state, for example after a successful configuration of lockable circuitry 110 when executing an instruction for secure configuration, for example when lockable circuitry 110 is configured to implement a computational module, for example a cryptographic function. Optionally, the security controller 107 is connected to the hardware lock bit 114 for the purpose of transitioning the hardware lock bit 114 to the locked state. Optionally during operation of system 100 the hardware lock bit 114 transitions to the unlocked state only by a power cycle of the reconfigurable computing device 102. Optionally during operation of system 100 the hardware lock bit 114 transitions to the unlocked state only by a power cycle of the entire system 100. Optionally, implementation of the hardware lock bit 114 comprises one or more of a SRAM bit, a ferroelectric random access memory (FRAM), a flip-flop circuit and an eFuse.

Optionally, the lockable circuitry 110 comprises a lock controller 113, optionally connected to the hardware lock 114. Optionally, the lock controller 113 is connected to the group of routing junctions 112, optionally for the purpose of delivering a persistent lock signal 115 thereto. Optionally, the lock controller 113 delivers the persistent lock signal 115 to the group of routing junctions 112 when the hardware lock bit 114 is in the locked state.

Figure 2:
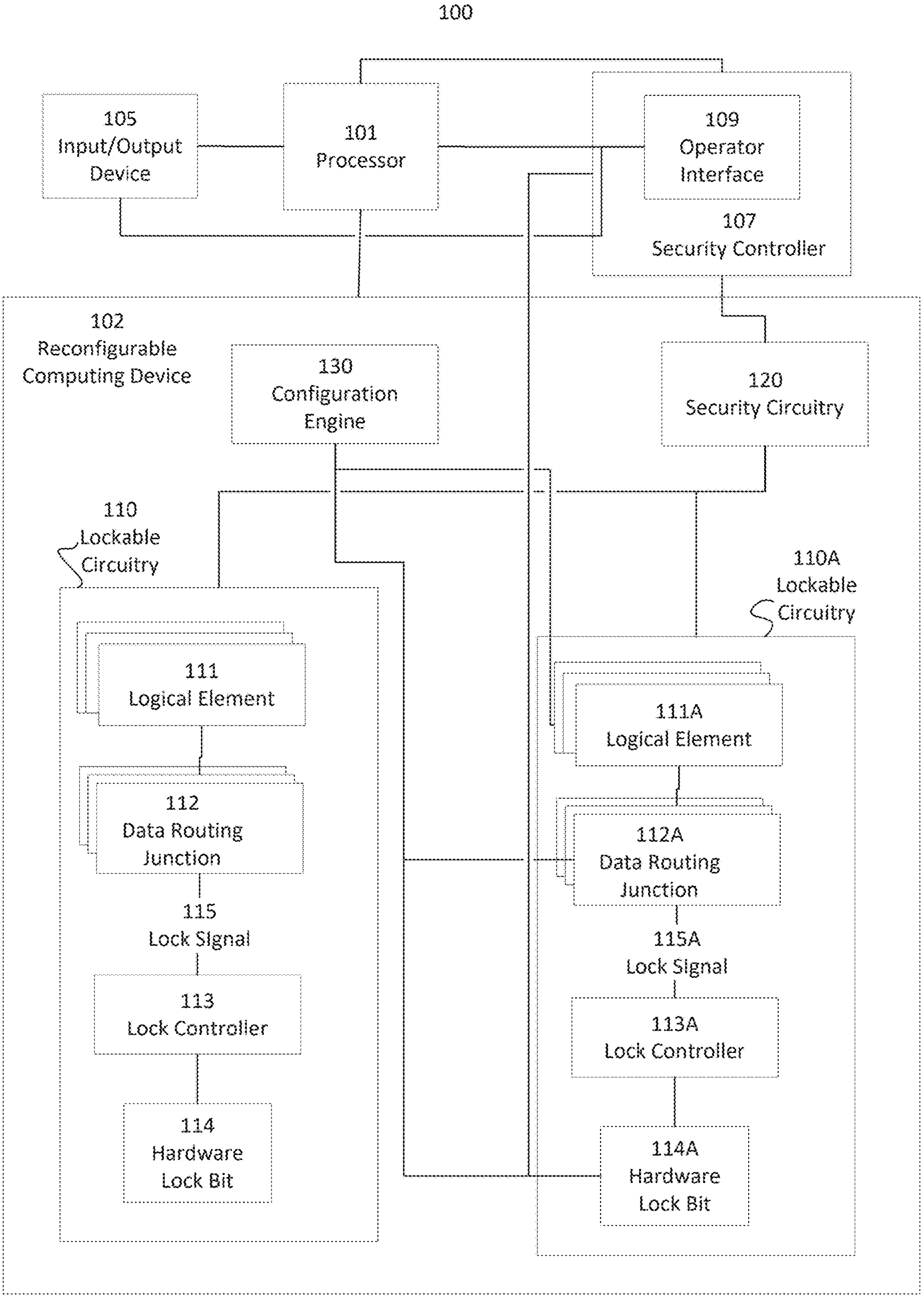
FIG. 2 is another schematic block diagram of the exemplary system, showing multiple lockable circuitries, according to some embodiments.

Optionally, reconfigurable computing device 102 comprises more than one lockable circuitry. Reference is now made also to FIG. 2, showing another schematic block diagram of the exemplary system 100, showing multiple lockable circuitries, according to some embodiments. In such embodiments, the reconfigurable computing device 102 comprises, in addition to lockable circuitry 110, one or more other lockable circuitries 110A. Similar to lockable circuitry 110, each of one or more other lockable circuitries 110A optionally comprises another group of logical elements 111A that comprises at least some of the plurality of logical elements of the reconfigurable computing device 102 and another group of routing junctions 112A that comprises at least some of the plurality of routing junctions of the reconfigurable computing device 102. Optionally, each of the one or more other lockable circuitries 110A is connected to the configuration engine 130 and additionally or alternatively to the security circuitry 120 and additionally or alternatively to the security controller 107.

Optionally, each of one or more lockable circuitries 110A comprises another hardware lock bit 114A and another lock controller 113A, optionally connected to the other hardware lock bit 114A and optionally connected to the other group of routing junctions 112A, optionally to deliver another persistent lock signal 115A.

Optionally, one or more lockable circuitries 110A operate independently of each other, and additionally or alternatively of lockable circuitry 110.

Figure 3:
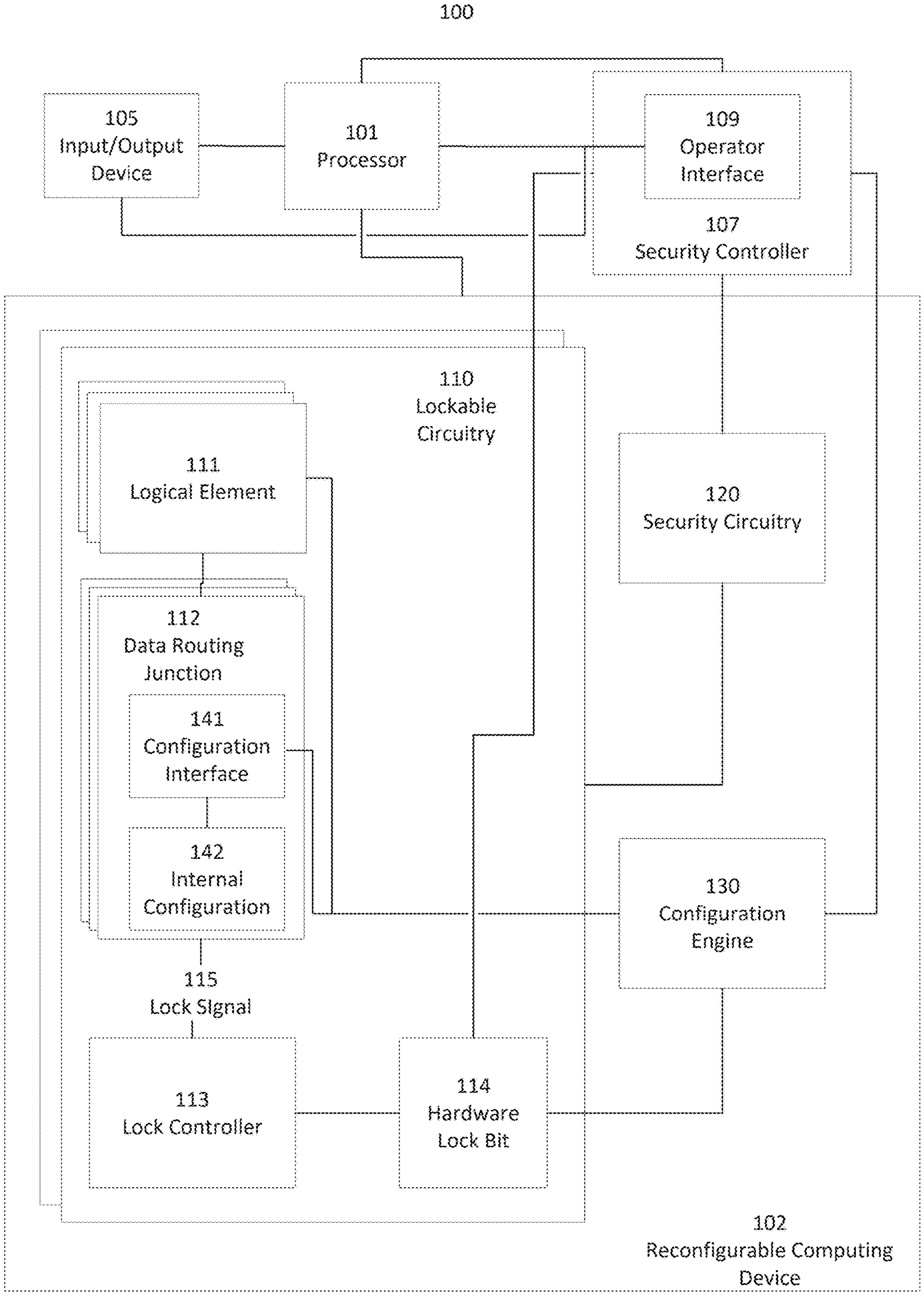
FIG. 3 is yet another schematic block diagram of the exemplary system, showing a detailed reconfigurable data routing junction, according to some embodiments.

Optionally, a routing junction is configured to connect to other components of the reconfigurable computing device 102. Reference is now made also to FIG. 3, showing yet another schematic block diagram of the exemplary system 100, showing a detailed reconfigurable data routing junction, according to some embodiments. In such embodiments, a routing junction comprises a configuration interface 141 and an internal configuration 142. Optionally, the configuration engine is connected to each of the group of data routing junctions 112 via the configuration interface 141 thereof. Optionally, when persistent lock signal 115 is not asserted, configuration engine 130 configures, i.e. manipulates, internal configuration 142 of each of the group of routing junctions 112 via the respective configuration interface 141 thereof. Optionally, when persistent lock signal 115 is asserted, each of the group of routing junctions 112 locks the internal configuration 142 thereof, and optionally declines to modify said internal configuration 142 in response to one or more configuration signals received via the respective configuration interface 141 thereof.

Optionally, other routing junction of the one or more other lockable circuitries 110A are implemented in a similar manner.

Figure 4:
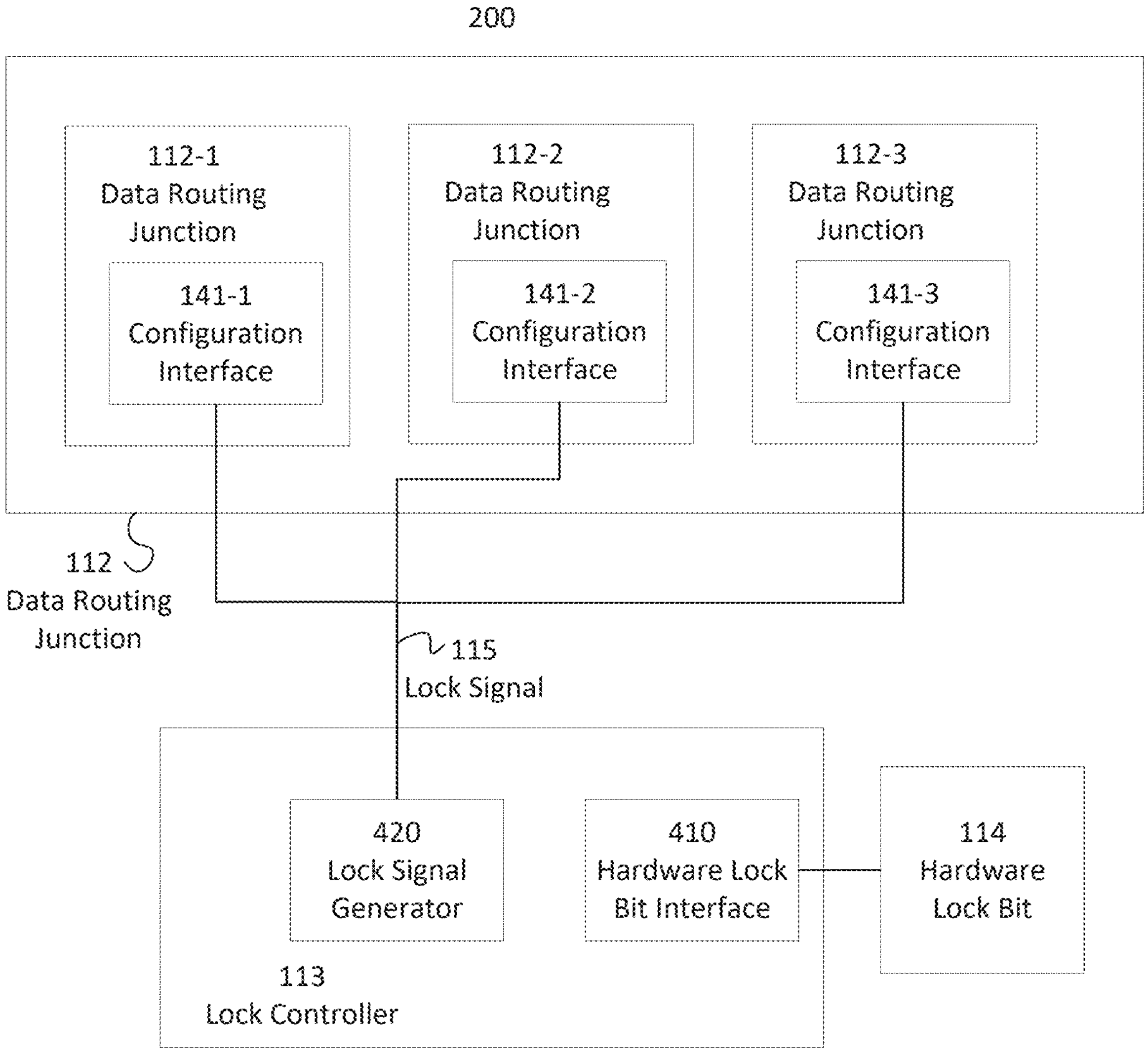
FIG. 4 is a schematic block diagram of part of the exemplary system, showing details of a lock controller, according to some embodiments.

Optionally, the lock controller 113 is configured to connect to each of the group of routing junctions 112. Reference is now made also to FIG. 4, showing a schematic block diagram of part 200 of the exemplary system 100, showing details of a lock controller, according to some embodiments. In such embodiments, the group of routing junctions 112 comprises at least routing junction 112-1, routing junction 112-2 and routing junction 112-3. Optionally, routing junction 112-1 comprises configuration interface 141-1. Similarly, routing junction 112-2 optionally comprises configuration interface 141-2 and routing junction 112-3 optionally comprises configuration interface 141-3.

Optionally, lock controller 113 comprises hardware lock interface 410 connected to the hardware bit 114. Optionally, lock controller 113 comprises lock signal generator 420. Optionally, lock signal generator 420 generates persistent lock signal 115, optionally when hardware lock bit 114 is asserted. Optionally, lock controller 113 delivers the persistent lock signal 115 to the respective configuration interface 141 of each of the group of routing junctions 112, in this example comprising configuration interface 141-1 of routing junction 112-1, configuration interface 141-2 of routing junction 112-2 and configuration interface 141-3 of routing junction 112-3.

Optionally, other lock controllers of the one or more other lockable circuitries 110A are implemented in a similar manner.

In some embodiments, system 100 implements the following optional method.

Figure 5:
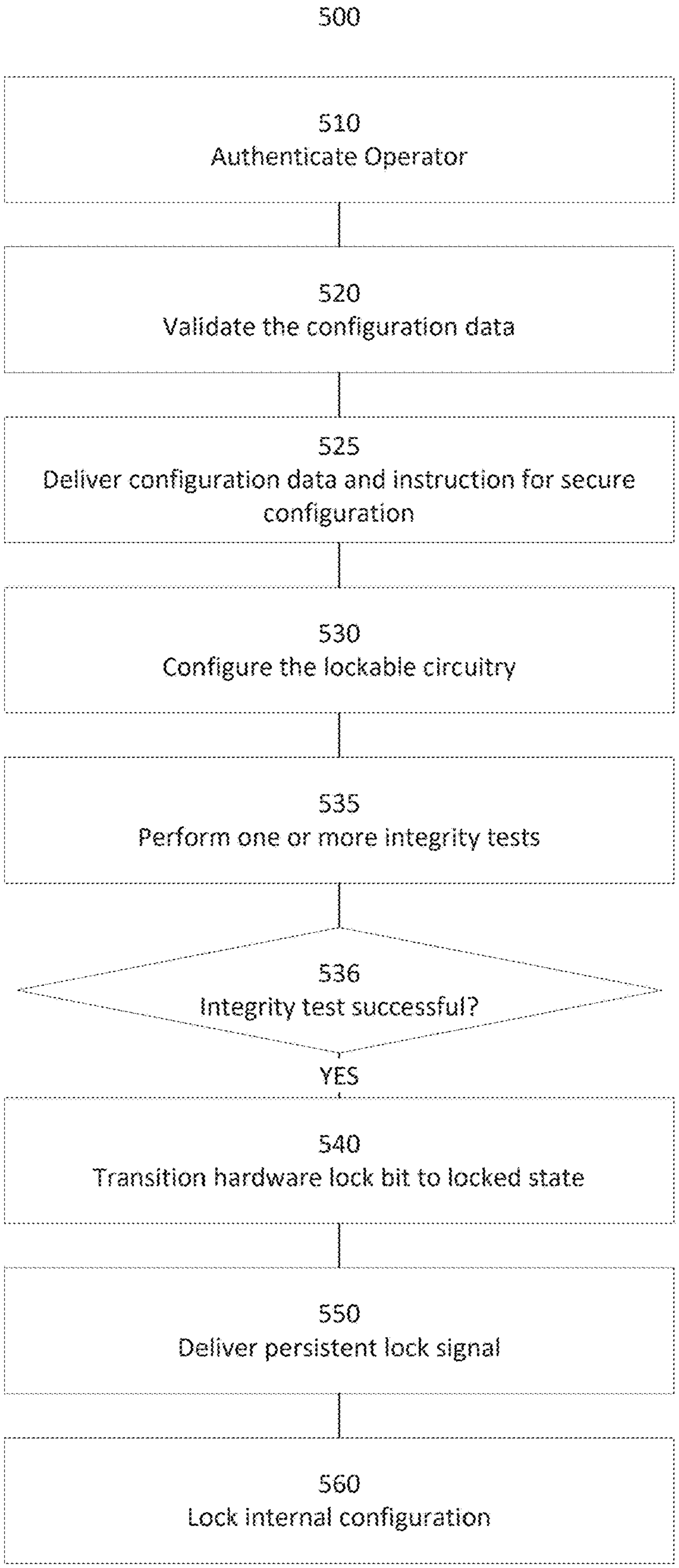
FIG. 5 is a flowchart schematically representing an optional flow of operations for secure configuration, according to some embodiments.

Reference is now made also to FIG. 5, showing a flowchart schematically representing an optional flow of operations 500 for secure configuration, according to some embodiments. In such embodiments, in 510 security controller 107 authenticates an operator of system 100. As described above, the operator may be one of a plurality of operators of system 100, and may be human or a software component executed by processing unit 101. In 520, the security controller 107 optionally validates configuration data for configuring lockable circuitry 110. Optionally, the configuration data is for configuring lockable circuitry 110 to implement a computational module. Optionally the computational module is a cryptographic function. Optionally, the security controller 107 validates the configuration data using a digital signature. Optionally, the security controller 107 instructs security circuitry 120 to perform the validation, optionally providing the security circuitry 120 with the configuration data. In 525, the configuration engine 130 optionally receives the configuration data and an instruction to perform a secure configuration, optionally by the security controller 107 delivering the configuration data and the instruction to perform the secure configuration to configuration engine 130.

Optionally, security controller 107 authenticates the operator in 510 before validating the configuration data in 520 and delivering the configuration data and the instruction to perform a secure configuration in 525.

In 530, configuration engine 130 optionally configures lockable circuitry 110 using the configuration data, optionally in response to receiving the instruction to perform the secure configuration. Optionally configuring lockable circuitry 110 comprises manipulating one or more of the group of routing junctions 112 of lockable circuitry 110. Optionally, configuration engine 130 configures a routing junction of the group of routing junctions 112 via the routing junction's configuration interface 141. Optionally, configuring a routing junction of the group of routing junctions 112 comprises manipulating the routing junction's internal state 142. Optionally, configuring the routing junction establishes one or more data paths between one or more logical elements of the group of logical elements 111. Additionally or alternatively, configuring the routing junction controls which operation or operations are performed by the one or more logical elements.

In 535, the security controller 107 optionally performs one or more integrity tests of the configuration of the lockable circuitry 110 after a successful configuration thereof using the configuration data. Optionally, the security controller 107 instructs the security circuitry 120 to perform the one or more integrity tests.

In 540, the hardware lock bit 114 is optionally transitioned to the locked state. Optionally, the configuration engine 130 transitions the hardware lock bit 114 to the locked state, optionally after successful completion of the configuration of the lockable circuitry 110 using the configuration data. Optionally, the security controller 107 transitions the hardware lock bit 114 to the locked state instead of the configuration engine 130, optionally after successful completion of the configuration of the lockable circuitry 110 using the configuration data, for example when the configuration engine 130 does not support an instruction for performing a secure configuration that is different from an instruction to perform a non-immutable configuration. An example of such an instruction is an instruction to "configure once", where the configuration engine declines additional configuration instructions after a successful configuration of the lockable circuitry 110.

Optionally, the hardware lock bit 114 is transitioned to the locked state following a successful outcome of the one or more other integrity tests. Optionally, in 536 the security controller 107 or the configuration engine 130 check the outcome of the one or more other integrity tests. Optionally, the security controller 107 transitions the hardware lock bit 114 to the locked state in response to an explicit lock command received from the operator authenticated in 510.

Optionally, in 550 lock controller 113 delivers persistent lock signal 115 to each of the group of routing junctions 112, optionally when hardware lock bit 114 is in the locked state. Optionally, in 560 each routing junction of the group of routing junctions 112 lock the internal configuration 142 thereof, optionally in response to assertion of the persistent lock signal 115, i.e. in response to the lock controller 113 delivering persistent lock signal 115 to the routing junction.

In 560, each of the group of routing junctions 112 optionally lock their respective internal configuration 142, optionally transforming the configuration of lockable circuitry 110 into an immutable configuration until a power cycle of system 100, and additionally or alternatively of reconfigurable computation device 102.

System 100 may execute method 500 more than once, for example to configure more than one lockable circuitry. Optionally, method 500 is used to configure lockable circuitry 110 to implement a first immutable computational module and to configure at least one of one or more other lockable circuitries 110A to implement a second immutable computational module. Optionally, system 100 executes method 500 in more than one iteration, each of the more than one iteration for configuring one of the one or more lockable circuitries 110A. Optionally, system configures one or more of the one or more lockable circuitries 110A in one iteration of method 500, for example comprising one execution of steps 525 and 530.

When the persistent lock signal 115 is asserted, a routing junction of the group of routing junctions 112 may decline to further modify the internal configuration 142 thereof.

Figure 6:
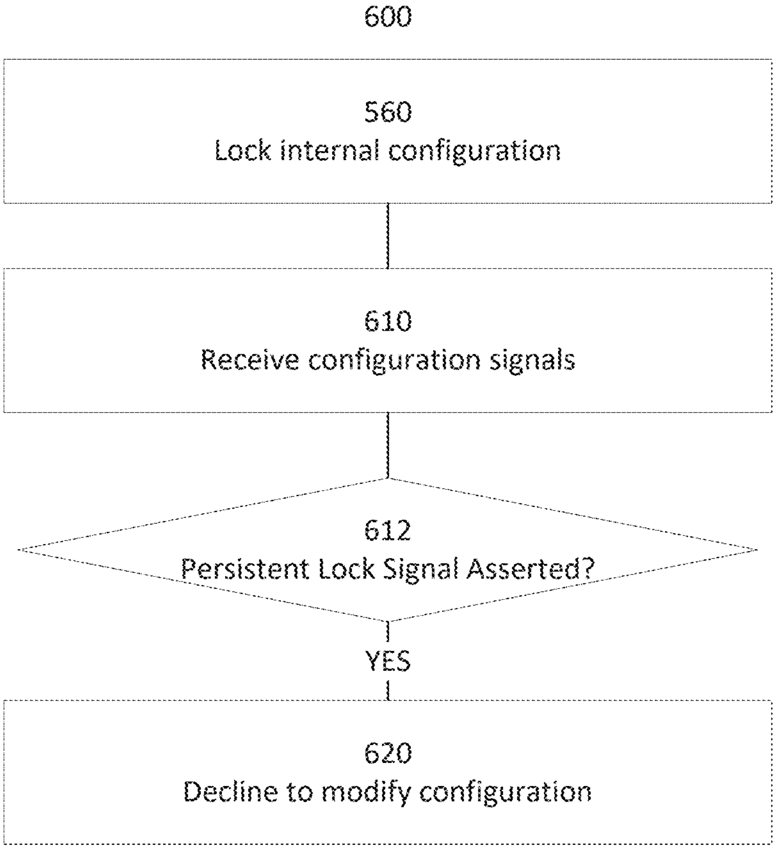
FIG. 6 is a flowchart schematically representing an optional flow of operations for a reconfigurable data routing junction, according to some embodiments.

Reference is now made also to FIG. 6, showing a flowchart schematically representing an optional flow of operations 600 for a reconfigurable data routing junction, according to some embodiments. In such embodiments, after locking internal configuration 142 in 560, in 610 a routing junction of the group of routing junctions 112 optionally receives one or more configuration signals, for example from configuration engine 130, optionally via configuration interface 141 thereof. In 612, the routing junction optionally checks that the persistent lock signal 115 is asserted. In response to the persistent lock signal 115 being asserted, in 620 the routing junction optionally declines to modify the internal configuration 142 thereof in response to the one or more configuration signals.

Optionally, each of the group of routing junctions 112 implements method 600.

In addition, when the persistent lock signal 115 is asserted, the configuration engine 130 may decline to further configure lockable circuitry 110.

Figure 7:
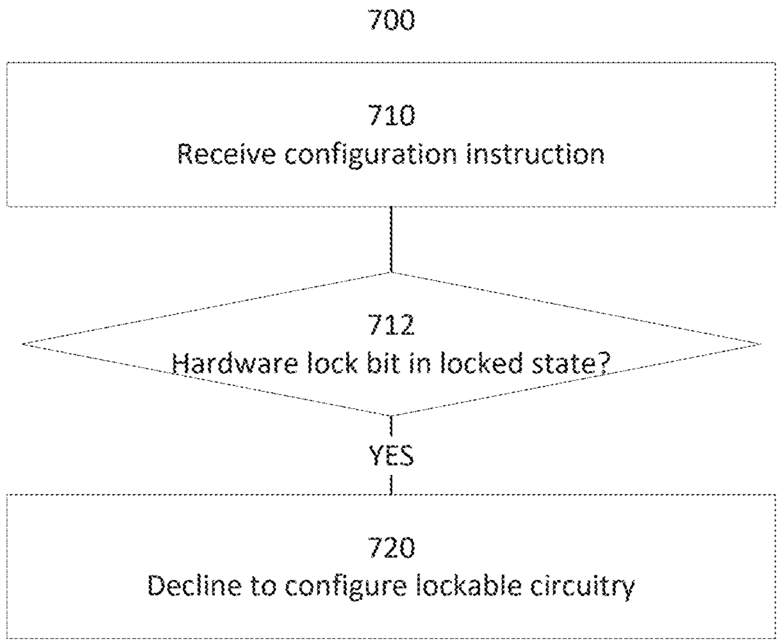
FIG. 7 is a flowchart schematically representing an optional flow of operations for a configuration engine, according to some embodiments.

Reference is now made also to FIG. 7, showing a flowchart schematically representing an optional flow of operations 700 for a configuration engine, according to some embodiments. In such embodiments, after hardware lock bit 114 is transitioned to the locked state, in 710 the configuration engine may receive one or more instructions to configure lockable circuitry 110, for example from processing unit 101. Optionally, in 712 the configuration engine 130 checks the state of hardware lock bit 114, and optionally upon determining the hardware lock bit 114 is in the locked state in 720 the configuration engine 130 declines to configure the lockable circuitry 110. Optionally, the configuration engine 130 executes steps 710, 712 and 720 more than once.

Figure 8:
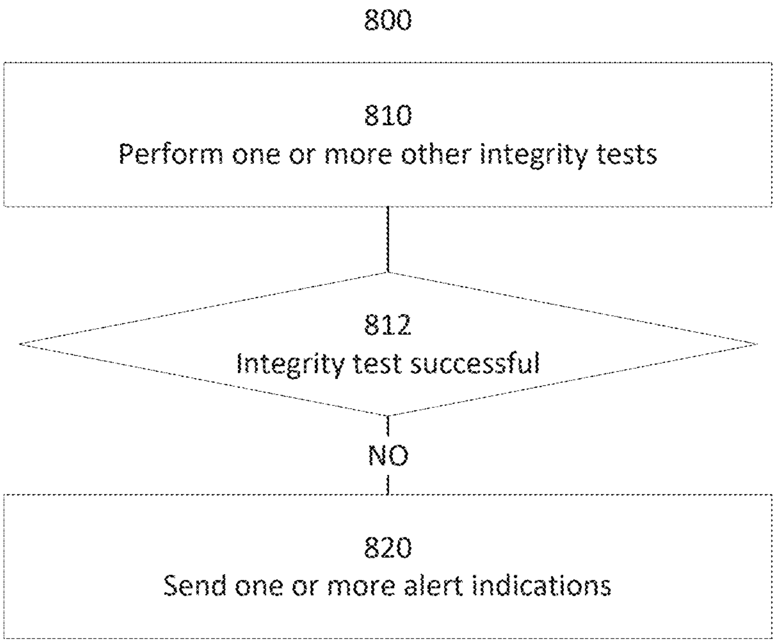
FIG. 8 is a flowchart schematically representing an optional flow of operations for a security controller, according to some embodiments.

Optionally, system 100 monitors the integrity of the configuration of the lockable circuitry 110. Reference is now made also to FIG. 8, showing a flowchart schematically representing an optional flow of operations 800 for a security controller, according to some embodiments. In such embodiments, in 810 security controller 107 performs one or more integrity tests of the configuration of lockable circuitry 110. Optionally, at least one of the one or more integrity tests are performed in 535 before transitioning the hardware lock bit 114 to the locked state. Optionally, security controller 107 performs at least one other of the one or more integrity tests periodically, optionally according to an identified time interval. Optionally, security controller 107 performs at least one additionally other of the one or more integrity tests in response to an instruction, for example from the operator authenticated in 510.

In 812, the security controller 107 may check whether the outcome of performing the one or more integrity tests is unsuccessful and in 820, security controller 107 optionally sends one or more alert indications to processor unit 101, for example to the security management software component executing therein.

An outcome of the one or more integrity tests may be used to control access to the computational module implemented in lockable circuitry 110 after secure configuration. For example, an application executed by processing unit 101 may invoke the computational module implemented in lockable circuitry 110. Optionally, before invoking the computational module, the application may communicate with the security management software component to check a security status of lockable circuitry 110. The security management software component may determine the integrity of lockable circuitry 110 according to an outcome of the one or more integrity tests performed by security controller 107. Security controller 107 may provide the security management software component with the outcome of performing the one or more integrity tests, for example by the one or more alert indications send in 820. The security management software component may decline access to the lockable circuitry 110 by the application when the outcome of performing the one or more integrity tests is unsuccessful. Additionally or alternatively, when the outcome of performing the one or more integrity tests is unsuccessful, security controller 107 optionally prevents operation of the lockable circuitry 110 such that an attempt to invoke the computational module fails. For example, when the application invokes the computational module without communicating with the security management software component, invocation of the computational module may be declined by security controller 107 preventing operation of the lockable circuitry 110.

Figure 9:
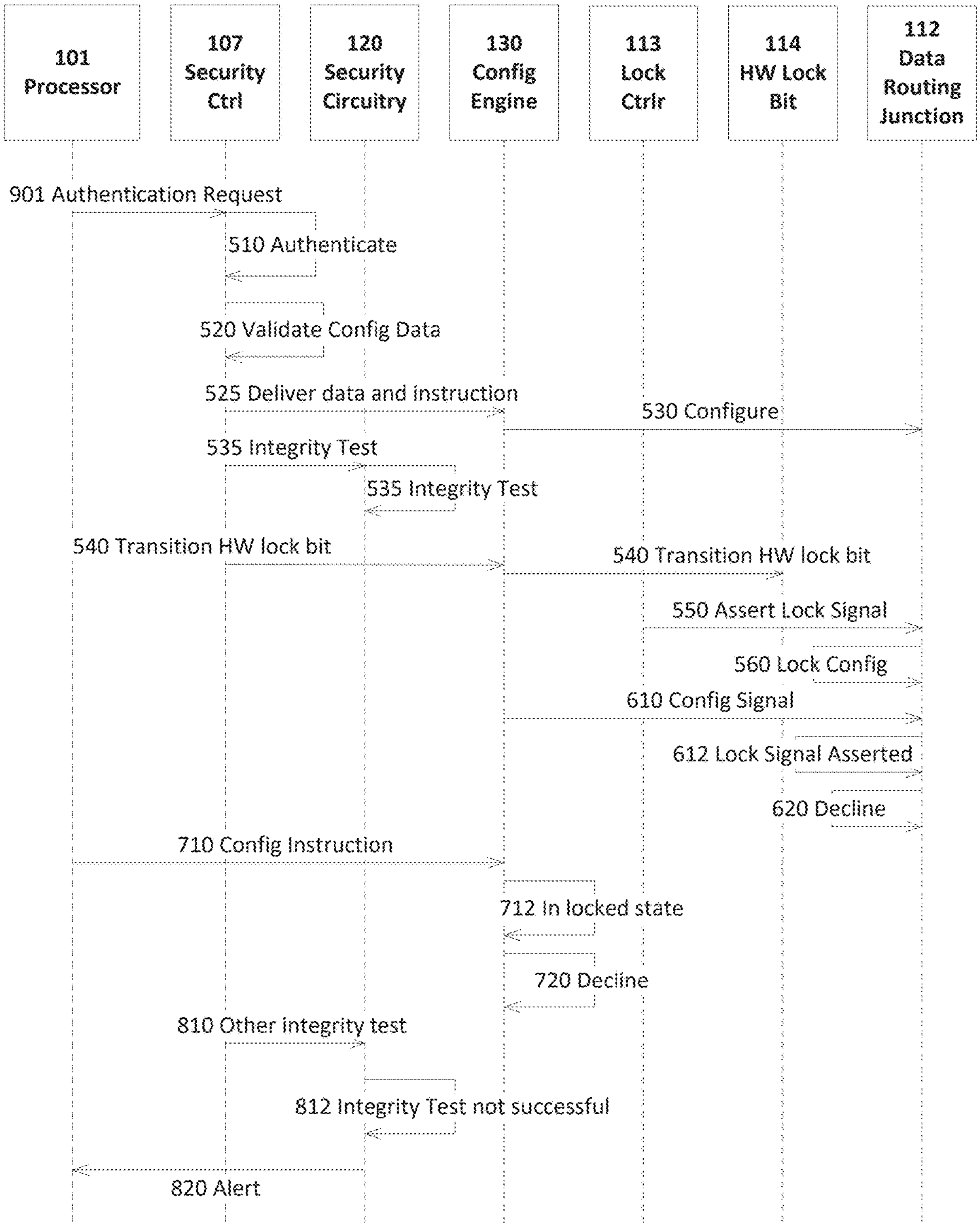
FIG. 9 is a sequence diagram of an optional flow of operations, according to some embodiments.

Reference is now made also to FIG. 9, showing a sequence diagram of an optional flow of operations 900, according to some embodiments. FIG. 9 illustrates the temporal relationships and interactions between the various components of system 100 during the secure configuration process, integrating the operational steps previously described in the individual flowcharts of FIGS. 5-8. The sequence diagram demonstrates how processing unit 101, security controller 107, configuration engine 130, lockable circuitry 110 including group of routing junctions 112, security circuitry 120, and hardware lock bit 114 coordinate to achieve immutable configuration of a computational module within the reconfigurable computing architecture. In the sequence diagram, the vertical dotted lines represent lifelines for different system components, with time progressing from top to bottom. For visual clarity, a separate lifeline is shown for each component, but these all operate within the same temporal framework. Reference numbers used in this sequence diagram correspond to the same elements introduced in earlier figures but are now arranged to show their temporal relationships and interactions during system operation.

The sequence begins with 901, wherein processing unit 101 optionally requests security controller 107 to authenticate an operator. Optionally, in 510 the security controller 107 authenticates the operator. In 520, the security controller 107 optionally validates configuration data and in 525 the security controller 107 optionally delivers to configuration engine 130 the configuration data and an instruction to perform a secure configuration. In 530, configuration engine 130 optionally configures lockable circuitry 110, including the group of routing junctions 112.

In 535, the security controller 107 optionally performs one or more integrity tests of the configuration of lockable circuitry 110. Optionally, performing the one or more integrity tests comprises the security controller 107 instructing the security circuitry 120 to perform the one or more integrity tests.

In 540, the security controller 107 optionally transitions the hardware lock bit 114 to the locked state. Optionally, transitioning the hardware lock bit 114 to the locked state comprises instructing the configuration engine 130 to transition the hardware lock bit 114 to the locked state. Optionally, the configuration engine 130 to transitions the hardware lock bit 114 to the locked state without receiving an instruction from security controller 107.

In 550, optionally when the hardware lock bit 114 is in the locked state, the lock controller 113 asserts the persistent lock signal 115 and optionally delivers the persistent lock signal 115 to each of the group of routing junctions 112. Optionally, in 560 each of the group of routing junctions 112 locks their respective internal configuration 142.

Optionally, in 610 one or more routing junctions of the group of routing junctions 112 receive one or more configuration signals, for example from configuration engine 130. Optionally, each of the one or more routing junctions determines in 612 that the persistent lock signal 115 is asserted and in 620 optionally declines to modify their respective internal configuration 142, which was optionally locked in 560.

Optionally, in 710 processing unit 101 sends configuration engine 130 one or more configuration instructions. In 712, the configuration engine 130 optionally determines that the hardware lock bit 114 is in the locked state and in 720 the configuration engine 130 declines configuring the lockable circuitry 110.

Optionally, in 810 the security controller 107 performs one or more other integrity tests to check the integrity of the configuration of the lockable circuitry 110. Optionally, in 812 the security controller 107 determines the outcome of performing the one or more other integrity tests was unsuccessful and in 820 the security controller 107 optionally sends processing unit 101 one or more alerts.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant hardware lock bits will be developed and the scope of the term "hardware lock bit" is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for computing comprising:

a reconfigurable computing device, comprising:

a lockable circuitry comprising:

a group of reconfigurable data routing junctions, each having a configuration interface and an internal configuration;

a lock controller, connected to each of the group of reconfigurable data routing junctions in the lockable circuitry; and a hardware lock bit, connected to the lock controller and having a locked state and an unlocked state;

wherein the lock controller is configured to deliver a persistent lock signal to each of the group of reconfigurable data routing junctions in the lockable circuitry when the hardware lock bit is in the locked state;

wherein the hardware lock bit is transitioned from the locked state to the unlocked state only by a power cycle of the system; and wherein each reconfigurable data routing junction in the lockable circuitry is configured to, in response to assertion of the persistent lock signal:

lock the reconfigurable data routing junction's internal configuration; and decline to modify the internal configuration in response to one or more configuration signals received via the configuration interface;

wherein the reconfigurable computing device further comprises at least one other lockable circuitry, each having:

another group of reconfigurable data routing junctions;

another lock controller; and another hardware lock bit;

wherein the at least one other lockable circuitry operates independently of the lockable circuitry.

2. The system of claim 1, wherein the reconfigurable computing device further comprises a configuration engine configured to:

receive configuration data and an instruction for secure configuration; and in response to the instruction for secure configuration:

configure the lockable circuitry of the reconfigurable computing device using the configuration data; and transition the hardware lock bit to the locked state following a successful configuration of the lockable circuitry using the configuration data.

3. The system of claim 2, wherein the configuration engine is further configured to:

at least once, decline to configure the lockable circuitry following transitioning the lock bit to the locked state.

4. The system of claim 2, further comprising a security controller configured to:

validate the configuration data; and deliver the instruction for secure configuration to the configuration engine.

5. The system of claim 4, wherein the security controller is further configured to authenticate an operator before validating the configuration data and delivering the instruction for secure configuration to the configuration engine.

6. The system of claim 4, wherein the security controller is further configured to transition the hardware lock bit to the locked state following a successful configuration of the lockable circuitry using the configuration data, instead of the configuration engine.

7. The system of claim 6, wherein the security controller is further configured to authenticate an operator before validating the configuration data and delivering the instruction for secure configuration to the configuration engine; and wherein the security controller is further configured to transition the hardware lock bit from the unlocked state to the locked state in response to an explicit lock command received from the authenticated operator.

8. The system of claim 4, wherein the security controller is further configured to perform at least one integrity test of the configuration of the lockable circuitry after a successful configuration of the lockable circuitry using the configuration data.

9. The system of claim 8, wherein the reconfigurable computing device further comprises security circuitry; and wherein the security controller is further configured to instruct the security circuitry to perform the at least one integrity test.

10. The system of claim 8, further comprising at least one hardware processor connected to the reconfigurable computing device;

wherein the security controller is further configured to send one or more alert indications to the at least one hardware processor upon an unsuccessful outcome of performing one or more of the at least one integrity test.

11. The system of claim 10, wherein the at least one hardware processor is configured to execute an application;

wherein the security controller is further configured to prevent operation of the lockable circuitry upon an unsuccessful outcome of performing one or more of the at least one integrity test.

12. The system of claim 8, wherein the security controller is configured to perform one or more of the at least one integrity test periodically, according to an identified time interval.

13. The system of claim 8, wherein the security controller is further configured to authenticate an operator before validating the configuration data and delivering the instruction for secure configuration to the configuration engine; and wherein the security controller is configured to perform one or more other of the at least one integrity test in response to an instruction from the authenticated operator.

14. The system of claim 1, wherein the hardware lock bit is implemented comprising a flip-flop circuit.

15. The system of claim 1, wherein the hardware lock bit is implemented comprising one or more of a Statice Random-Access Memory (SRAM) bit and a ferroelectric random access memory (FRAM).

16. The system of claim 1, wherein the lockable circuitry further comprises a group of reconfigurable logical elements, wherein the group of reconfigurable logical elements are connected by the group of reconfigurable data routing junctions.

17. The system of claim 16, wherein at least one reconfigurable data routing junction of the group of reconfigurable data routing junctions is connected to at least one of the group of reconfigurable logical elements;

wherein the at least one reconfigurable logical element can be configured to implement one of a plurality of operations; and wherein the at least one reconfigurable data routing junction selects one of the plurality of operations to be implemented by the at least one reconfigurable logical element.

18. The system of claim 1, wherein the hardware lock bit is implemented comprising an electronic fuse (eFuse).

19. A method for a system for computing, comprising:

configuring a lockable circuitry of a reconfigurable computing device, the lockable circuitry comprising a group of reconfigurable data routing junctions, each having a configuration interface and an internal configuration;

transitioning a hardware lock bit of the lockable circuitry to a locked state, where the hardware lock bit has a locked state and an unlocked state and the hardware lock bit is transitioned from the locked state to the unlocked state only by a power cycle of the system;

delivering a persistent lock signal to each of the group of reconfigurable data routing junctions of the lockable circuitry when the hardware lock bit is in the locked state; and by each reconfigurable data routing junction of the group of reconfigurable data routing junctions, in response to assertion of the persistent lock signal:

locking the reconfigurable data routing junction's internal configuration; and declining to modify the internal configuration in response to one or more configuration signals received via the configuration interface;

wherein the reconfigurable computing device further comprises at least one other lockable circuitry, each having:

another group of reconfigurable data routing junctions;

another lock controller; and another hardware lock bit; and wherein the at least one other lockable circuitry operates independently of the lockable circuitry.

20. A device for computing, comprising:

a lockable circuitry comprising:

a group of reconfigurable data routing junctions, each having a configuration interface and an internal configuration;

a lock controller, connected to each of the group of reconfigurable data routing junctions in the lockable circuitry; and a hardware lock bit, connected to the lock controller and having a locked state and an unlocked state; and at least one other lockable circuitry, each having:

another group of reconfigurable data routing junctions;

another lock controller; and another hardware lock bit;

wherein the lock controller is configured to deliver a persistent lock signal to each of the group of reconfigurable data routing junctions in the lockable circuitry when the hardware lock bit is in the locked state;

wherein the hardware lock bit is transitioned from the locked state to the unlocked state only by a power cycle of a system in which the device operates;

wherein each reconfigurable data routing junction in the lockable circuitry is configured to, in response to assertion of the persistent lock signal:

lock the reconfigurable data routing junction's internal configuration; and decline to modify the internal configuration in response to one or more configuration signals received via the configuration interface; and wherein the at least one other lockable circuitry operates independently of the lockable circuitry.

* * * * *